United States Patent
Aechter et al.

[11] 3,887,871
[45] June 3, 1975

[54] VARIABLE QUANTITY MEASURING DEVICES

[75] Inventors: Burckhard Aechter, Achim; Manfred Gerlach, Bremen-Mahndorf, both of Germany

[73] Assignee: Fried Krupp Gesellschaft mit beschrankter Haftung, Essen, Germany

[22] Filed: Oct. 31, 1973

[21] Appl. No.: 411,319

[30] Foreign Application Priority Data
Nov. 4, 1972  Germany............................ 2254019

[52] U.S. Cl................ 324/181; 324/58 R; 324/188
[51] Int. Cl. ............................................. G04f 9/00
[58] Field of Search ............. 324/181, 185, 188, 58

[56] References Cited
UNITED STATES PATENTS
3,107,329  10/1963  McSkimin........................... 324/185

*Primary Examiner*—Stanley T. Krawczewicz
*Attorney, Agent, or Firm*—Spencer & Kaye

[57] ABSTRACT

A system for producing a reference value for a desired value of an independent variable of a nonlinear function for which, in the range of interest, the dependent variable varies regularly and unidirectionally with variations of the independent variable in a given direction, according to a known function, the reference value being produced by simultaneously determining the values of the dependent variable for successive pairs of independent variable values which differ by a selected amount, while varying the independent variable, and producing an indication of one of the independent variable values of that pair at which a given ratio exists between the dependent variable values, this ratio corresponding to a predetermined independent variable difference between such one independent variable value and the desired value.

12 Claims, 13 Drawing Figures

VARIABLE QUANTITY MEASURING DEVICES

BACKGROUND OF THE INVENTION

The present invention relates to a circuit arrangement for producing a reference value for a desired value of the independent variable of a nonlinear function, particularly for a function in which, in a range of interest, the relationship between the dependent variable and the independent variable is known and the dependent variable varies regularly with changes of the independent variable in a given direction, the ratio between the reference value and the desired value being given by this function relationship. The invention employs a measuring arrangement which responds to a critical value of the dependent variable.

It is known to obtain reference values for desired values of the independent variable of a known function curve or relationship, by means of arrangements of measuring devices in the form of threshold stages which respond to given values of the dependent variable. In these arrangements a reference signal is actuated when the dependent variable exceeds a given threshold constituting the set critical value.

With such threshold stages, however, it is generally possible to only determine individual values, particularly those which are significant with respect to the steepness of the function curve, because only with a sufficient steepness in the function of the independent variable will a reproduceable actuation of the reference value display take place. A change in scale, particularly an increase with respect to the dependent variable, would produce a steeper function curve for a less steep function and thus a closer tolerance range for the response of the actuation, but it would cause an offset of the reference value as a whole since the actuation of the reference value would then take place at a different value of the independent variable.

Particularly when the zero point of an envelope curve is determined for a known oscillation of varying amplitude there results a wide margin of error if such an independent variable is to be determined over threshold stages or if, according to a known method, some reference value of the envelope curve is to be determined.

The exact determination of the zero point of such an envelope curve is made more difficult by the physical condition that the curve is defined only mathematically by the locus of the peak values of the varying amplitude oscillation, i.e., the envelope curve cannot be measured without interruptions. Known solutions with smoothed full wave rectification produce only an approximate envelope curve, particularly in the portion associated with the first oscillations, so that errors occur inevitably because this only approximated envelope curve is evaluated via threshold stages.

When the threshold measurement is made upon the carrier oscillations instead of upon the envelope curve, the switching values will be more accurate because the edge to be evaluated is steeper, but there exists the danger of ambiguity in that one or a plurality of oscillations are missed because their amplitudes still lie below the set threshold and one of the subsequent oscillations with higher amplitude is determined as the supposedly wanted point on the envelope curve. This will have an undesirable effect, particularly if there exist amplitude fluctuations which result, for example, from interference, or noise, and which may be caused by interference phenomena as well as by amplification fluctuations or superposed noise levels.

Thus this method also presents a wide margin of error in the determination of the desired variable.

SUMMARY OF THE INVENTION

In view of these difficulties in the procedures known in the prior art, it is an object of the present invention to obtain accurate reference values for each desired point in a known nonlinear function which regularly increases or decreases, i.e., whose slope, or first derivative, varies continuously in a given direction.

The present invention is based on the knowledge that in curves of this type a particular relation between once given pairs of values can occur only at one point in the known curve which can be mathematically determined.

The objects are achieved according to the present invention in that in addition to a first measuring arrangement, at least one further measuring arrangement for the dependent variable is additionally provided, the measuring arrangements being effective with an offset of given distances between values of the independent variable, and a comparator is connected in series with the measuring arrangements to produce a reference signal representing the reference value when a given ratio exists between the determined dependent variables.

In an advantageous embodiment of the present invention, only two measuring arrangements are employed, the first measuring arrangement including a measurement receiver with a series-connected, non-attenuating independent variable shift member for shifting the receiver output relative to the independent variable, and the second measuring arrangement including a, possibly the same, measurement receiver with a series-connected non-shifting attenuation member. The shift is set to the given distance between the values of the independent variable, the attenuation is set, according to the known function curve, to the given ratio between the two determined dependent variables. The outputs of the two measuring arrangements are each connected with a respective input of a comparator, a reference signal appearing at the output of the comparator when the given ratio exists between its two input signals.

While in the known threshold methods a change in the correct scale, e.g. an increase in amplitude for the function curve always leads to changed response values, the present invention provides an absolute measurement. A uniform change in the function curve no longer influences the response value since it is derived from a quotient formation so that all dependent variable scale influences, i.e., degree of amplification, are eliminated.

The desired reference value is thus found at the moment when, during scanning along the function curve, the dependent variables at the given distance from one another along the independent variable reach a ratio to one another which is known from the mathematical function curve.

If the desired value of the independent variable, according to a preferred embodiment of the present invention, is the zero point of an envelope curve of known shape of oscillations with rising or falling amplitude and known period, the values of the dependent variables are determined by the peak values of two given, preferably consecutive, oscillation cycles and the given distance is determined by the period value. At the moment when the given ratio between the two consecutive peak values is present, the reference value has been obtained. The difference between the reference value and the independent variable value of the desired zero point is completely determined by the known shape of the envelope curve, the given ratio indicating how many cycles after the zero point the reference signal must appear.

The cycles which are advisably to be evaluated are the first few whose amplitudes exceed the practically always present noise level. In this range the envelope curve has also definitely not yet changed to a more flattened curve so that a defined ratio is present for the selected peak values. Experience has shown that interference phenomena will not appear before approximately the sixth cycle.

When the present invention is employed for the reception of wave energy it is also important that the above-mentioned signal range of interest be free of interference which could occur due to multiple reflections of the first oscillations in the propagation medium. Interference occurring outside of the described signal range do not interfere with the operation of the circuit arrangement according to the present invention.

The location of the zero point of the envelope curve can be accurately determined, by evaluation in the above-mentioned range, even if the zero point itself is covered by the noise level. Thus an accuracy is attained for the determination of the travel time of pulses which could previously be realized only with difficulty and mostly at great expense.

Since experience has shown that still present interfering influences which are superposed on the oscillations primarily show an effect in amplitude fluctuations and not in frequency fluctuations of the oscillations, it may be advisable to actuate the reference signal not immediately upon the detection of the given ratio, but rather at the subsequent zero passage of the oscillations in a given direction, i.e., in the steepest part of the oscillation curve, so that the reference signal can be better reproduced.

In order to realize this advantageous embodiment, a zero passage detector is connected to a measurement receiver and has its output connected with a trigger input of the comparator. The comparator is enabled to emit the reference signal when its input signals have a given ratio to one another, whereupon the reference signal is released by a signal at the trigger input of the comparator during the subsequent zero passage in the given direction.

In order to determine the travel time of pulses consisting of oscillations at known frequencies and appearing at the output of a transmission channel which has variable travel times and variable attenuation, a further advantageous apparatus embodiment of the present invention provides a time measurement device which is started upon the actuation of a pulse at the input of the transmission channel. At the output of the transmission channel measurement receivers are provided which have a known transient behavior from which the shape of the envelope curve is determined, a comparator being connected in series therewith. In dependence on the occurrence of the reference signal the time measurement device is stepped.

In this special application there exists the problem that the signals emitted by the measurement receiver initially have very low amplitudes, which rise only with time and only then can be distinguished from the steady noise background. For the above-mentioned reasons it is difficult with conventional means to accurately and reproduceably determine the exact time reference of the beginning of the pulse constituting such an oscillation cycle at the output of the transmission channel.

This problem is solved with the present invention in that a referenced value is derived from those oscillations which already have the evaluatable amplitude. The time at which the reference signal appears serves to determine accurately and repeatedly via the known envelope curve, the zero point, i.e., the beginning of the envelope curve, and thus the time at which the pulse begins at the output of the transmission channel, because the time of appearance of the reference signal is mathematically defined with respective to the desired zero point by the function curve which is known from the transient behavior of the measurement receivers.

Direct time measurement between the desired zero point and the appearance of the reference signal is possible by shortening the time indication of the time measurement device by the time interval of the given known number of oscillations. Alternatively, the time measurement device may be started with a delay which corresponds to this known time interval. With this type of time measurement the time interval between enabling and releasing of the reference signal must be additionally correspondingly considered when a zero passage detector is used to actuate the reference signal.

The present invention thus makes it possible to provide a circuit arrangement with which reference values for a desired value of an independent variable can be obtained for a known regularly rising or falling nonlinear function, the circuit arrangement providing the accurate result independent of the selected scale relationship between the independent and dependent variables.

The present invention provides a particularly dependable and easy determination of the zero point of an envelope curve of oscillations with rising or falling amplitudes, thus realizing an accurate travel time determination of pulses consisting of oscillations, practically independent of attenuation fluctuations in in the transmission path. The use of this circuit arrangement is, however, not limited to time-dependent functions and the independent variable may be any measurable physical value. For example, the present invention may be used for the evaluation of a temperature curve relative to distance coordinates.

DESCRIPTION OF THE PREFERRED EMBODIMENTS

Figure 1:
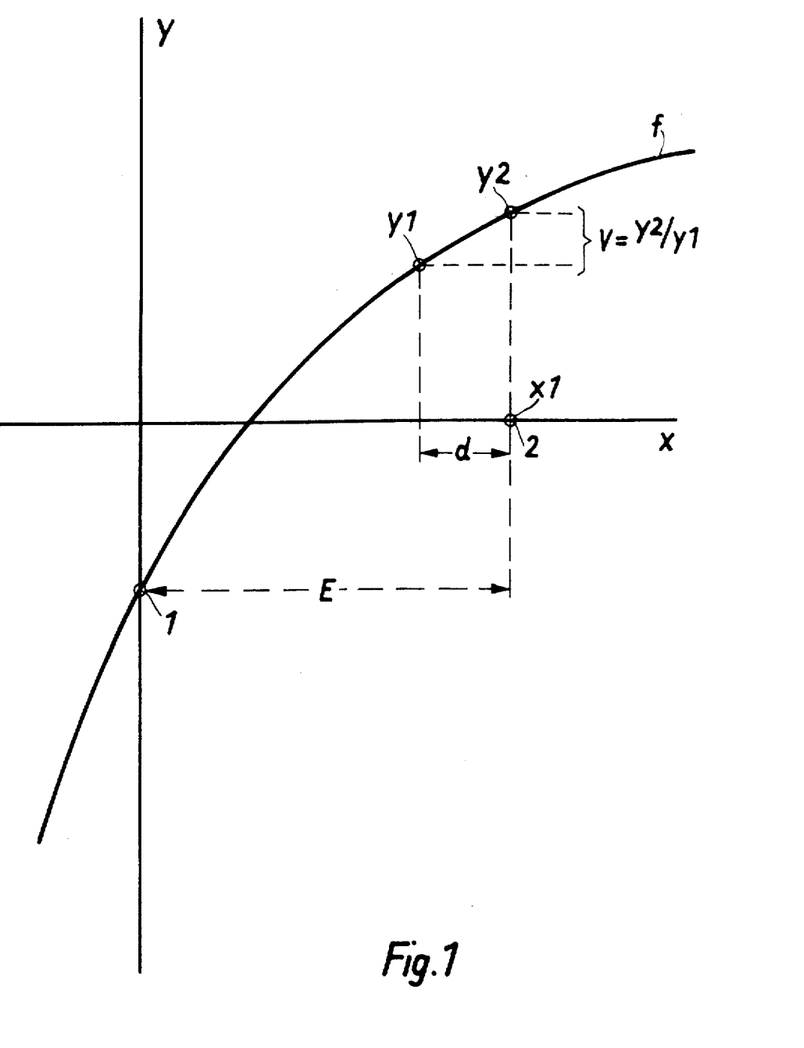
FIG. 1 shows a continuously rising curve of a nonlinear function in a coordinate system, and is used in explaining the operation of circuits according to the invention.

FIG. 1 shows the form of a continuously and regularly rising nonlinear function $f$, having a known range of interest, plotted in a coordinate system as a dependent variable $y = f(x)$, $x$ being plotted on the abscissa.

A desired value 1 of the independent variable $x$ may be directly associated with a dependent variable reference value 2 or may lie at a known distance E along the abscissa therefrom, the latter being the case in FIG. 1. The desired value 1 is assumed to be a value which cannot be detected directly and reproduced dependably because, for example, as shown in FIG. 1, the passage of function $f$ through the value of the independent variable $x$ corresponding to $x = 0$ is desired and for technical reasons the zero value cannot be detected by measurements, or, for example, because this desired value 1 has a sign which is not compatible with the given measurement receiver. For this reason the reference value 2 is determined according to the present invention, at another point in the curve of the function $f$ and a conclusion is then made from this reference value 2 as to the desired value 1 at the known distance E.

In order to obtain the reference value 2, two values $y1$, $y2$ of the dependent variable $y$ are continuously measured at a given abscissa distance $d$ between two values of the independent variable $x$ along the function $f$.

A ratio V is formed from the measured values $y1$ and $y2$. When the given ratio V is present for the two values $y1$ and $y2$, the reference value 2 is found with the value for the independent variable $x1$ which belongs to the dependent variable $y2$, since for a given nonlinear function curve with a slope which varies continuously in a given direction the desired ratio V for a given distance $d$ will appear only once. This given ratio V can be determined for the pair of values of interest from the curve of the given function $f$.

The distance E and the spacing $d$ are selected so that the values $y1$ and $y2$ can be easily measured and distinguished from one another at these points due to the shape of the function curve $f$. Thus the determination of the desired value 1 is no longer dependent on the location of the desired value 1 itself.

It is here particularly advantageous for the practice of the present invention that it is sufficient to know merely the path, or shape, of the curve of function $f$, independent of the respective absolute values and thus of scale factors. The reference value 2 is obtained merely from the presence of the scale independent ratio V between the two values $y1$ and $y2$.

This ratio V can occur only once in the region of the function curve $f$ under consideration and of interest, in which the path is regular and nonlinear, so that the reference value 2 is clearly defined. The terms "regular" and "regularly" employed herein signify that the scope of the curve varies in a given direction as the value of the independent variable increases. In other words the slope is continuously increasing or decreasing.

Due to the known shape of the function curve $f$, determination of a given distance $d$ permits the determination of any desired value 1 of the independent variable $x$ within the portion of function $f$ under consideration, and this desired value 1 can be lower or higher than the reference value 2. The distance $d$ can be freely selected so that a favorable ratio V will be realized.

Figure 2:
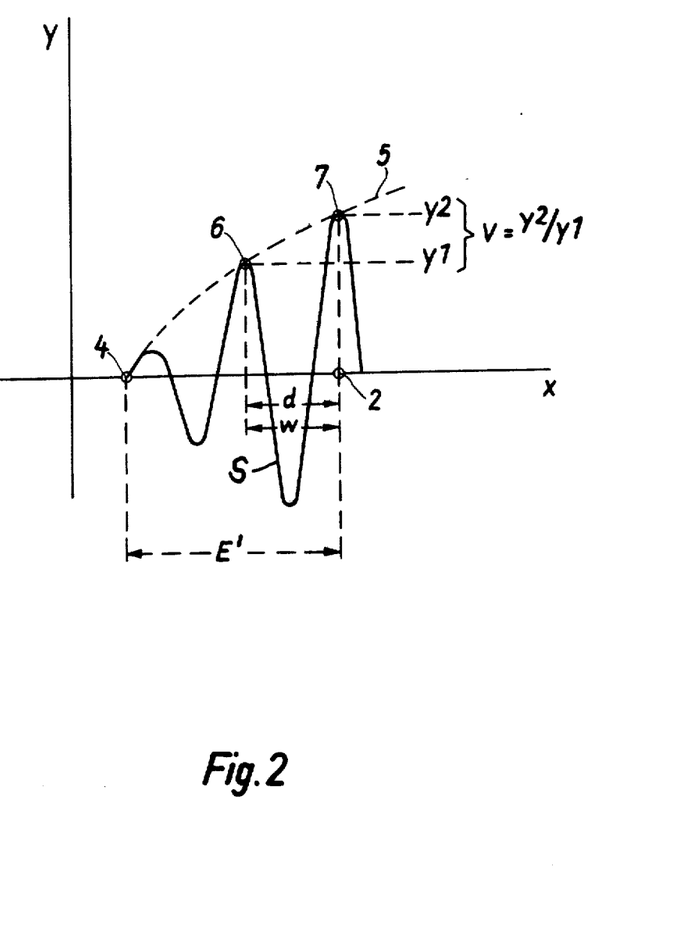
FIG. 2 shows the curve of oscillations with continuously increasing peak amplitude and a known function curve for the envelope curve of these oscillations, also used in explaining the operation of circuits according to the invention.

Turning to FIG. 2, a zero point 4 of an oscillation S with rising amplitude and a known oscillation width, or period, $w$ can be determined in accordance with the present invention if the envelope curve 5 of the oscillation S has a known regular and nonlinear function curve, at least at its beginning. In order to determine the abscissa value of the zero point 4 as the desired value 1 in a manner analogous to that described in connection with FIG. 1, the values $y1$ and $y2$ are measured as the peak values 6 and 7 of the oscillation S, the given distance $d$ being equal to the width $w$. With a given ratio V between these peak values 6 and 7 it is known, from the known function curve shape of envelope curve 5, whose absolute shape need not be known, how many cycles after the zero point 4 this ratio V of the peak values 6 and 7 must be present. Thus the distance E' of the reference value 2 from the zero point 4 of the envelope curve 5 is known.

Figure 3:
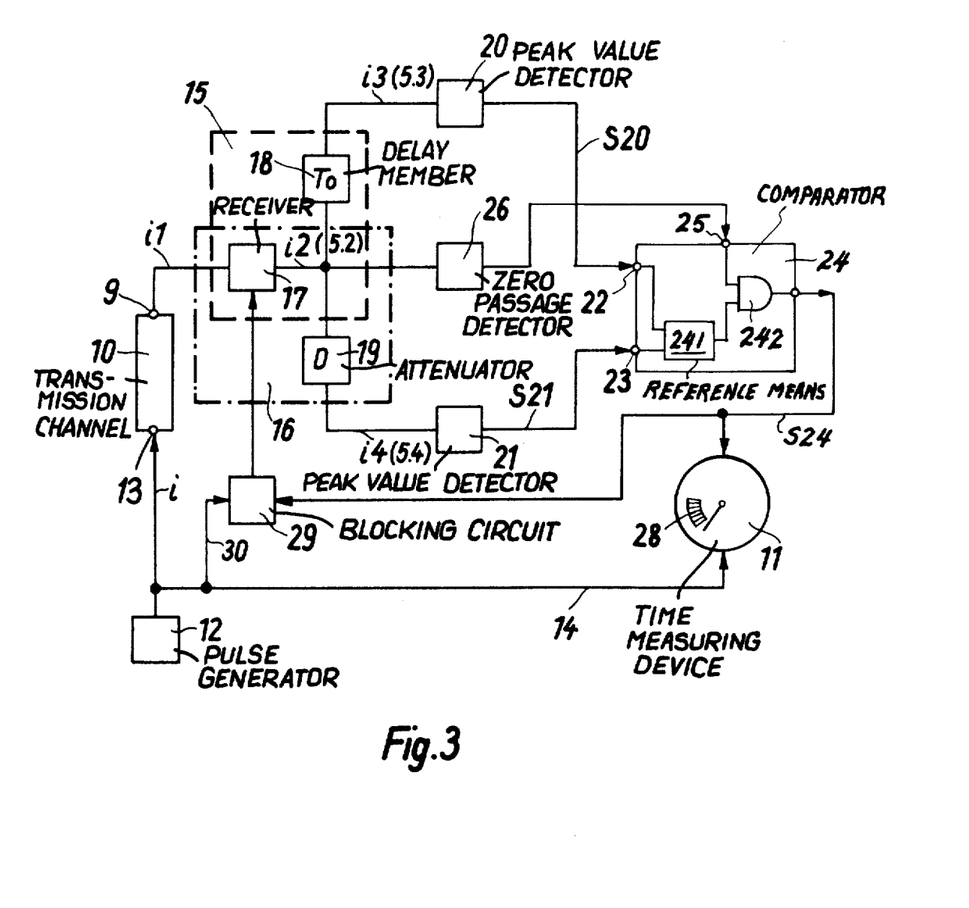
FIG. 3 is a block circuit diagram for a preferred embodiment of a circuit arrangement according to the invention for travel time determination.

FIG. 3 illustrates a circuit arrangement in accordance with the invention for measuring a curve whose abscissa, or independent variable, is time.

As shown in FIG. 3, a time measuring device 11 is provided to produce a measurement of the travel time of pulses $i1$ whose waveform corresponds to oscillation S shown in FIG. 2, assuming the abscissa to be in units of time. Pulses $i1$ are present at the output 9 of a transmission channel 10 presenting variable travel times. A pulse generator 12 emits pulses $i$ at the input 13 of the transmission channel 10 and initiates operation of the time measuring device 11 via a start line 14.

At the output 9 of the transmission channel 10 a measurement receiver 17 is provided for converting the pulses $i$ into electrical signals $i2$, for example. The transient response of the measurement receiver 17 provides an indication of the shape of the envelope curve 5 of the signals $i2$, as shown in FIG. 2. The two values $y1$ and $y2$, indicated in FIG. 2, are determined by two respective measuring arrangements 15 and 16, the measuring arrangement 15 including, in this embodiment of the present invention, the measurement receiver 17 with a series-connected non-attenuating delay member 18. The delay time $T_o$ is set, as shown in FIG. 4a to the distance between the two values $y1$ and $y2$ along the independent variable axis, i.e., in this case to the time interval $ty2 - ty1$ corresponding to one or a plurality of periods $w$ of the oscillation S.

Figure 4A:
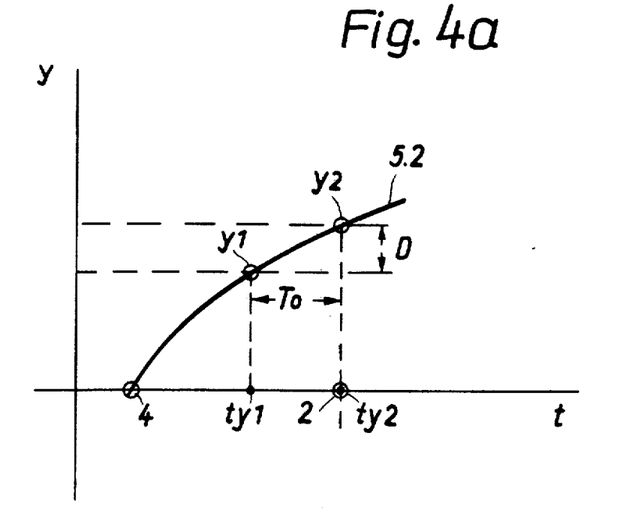
FIGS. 4a and 4b show the envelope curve shapes for signals at various measuring points in the circuit of FIG. 3.
Figure 4B:
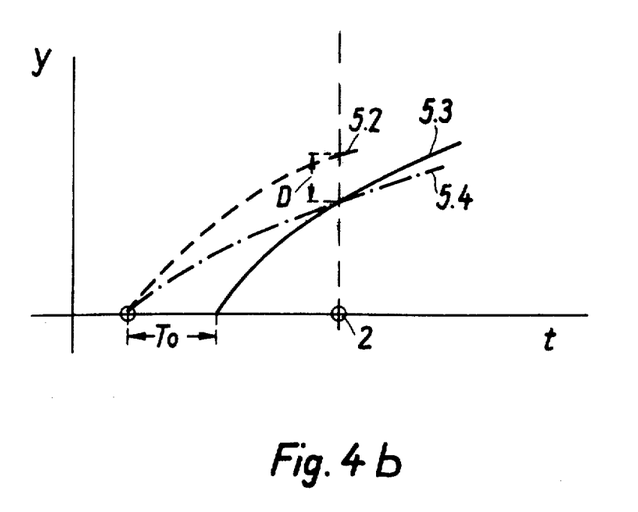

The measuring arrangement 16 also includes the measurement receiver 17 and a series-connected non-delaying attenuation member 19 whose attenuation D is oriented to the given ratio between the values $y1$ and $y2$, which is known from the known shape of the envelope curve 5.2 of FIGS. 4a and 4b, in this case this being the ratio V between the peak values 6 and 7 of FIG. 2, separated by the time $T_o$ between successive peaks of oscillation S.

Figures 5A, 5B, 5C:
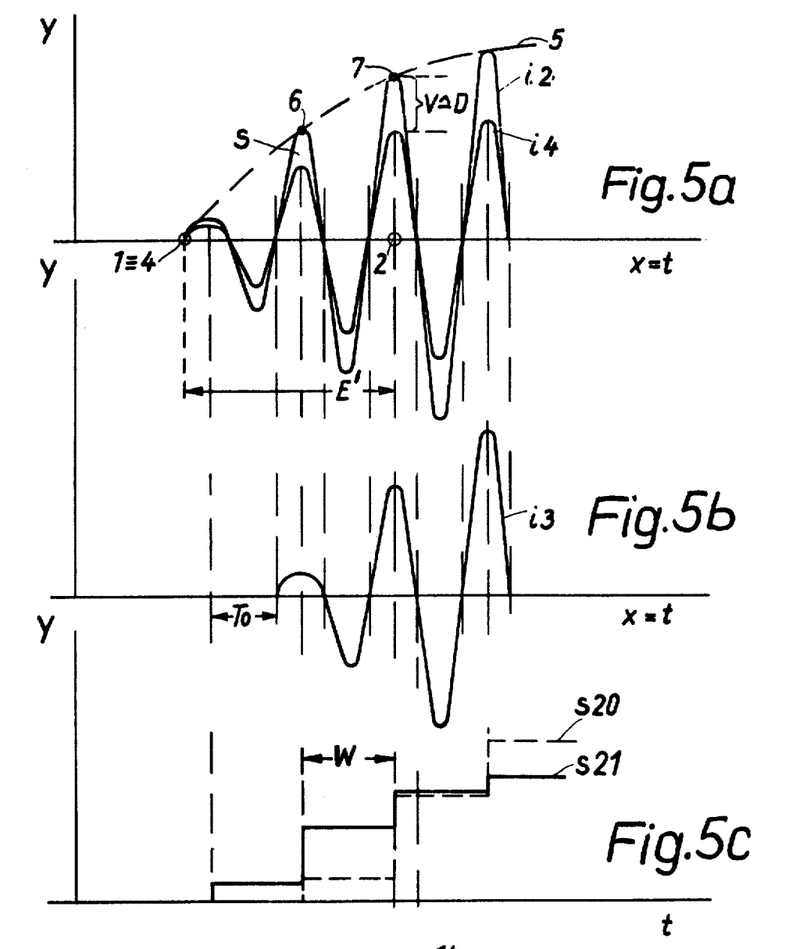
FIGS. 5a, 5b, 5c and 5d show, respectively, the first cycles of a pulse furnished by a measurement receiver at the output of a transmission channel, and the output signals from an attenuation member, a dead range member, two peak value detectors and a comparator, in the circuit of FIG. 3.
Figure 5D:
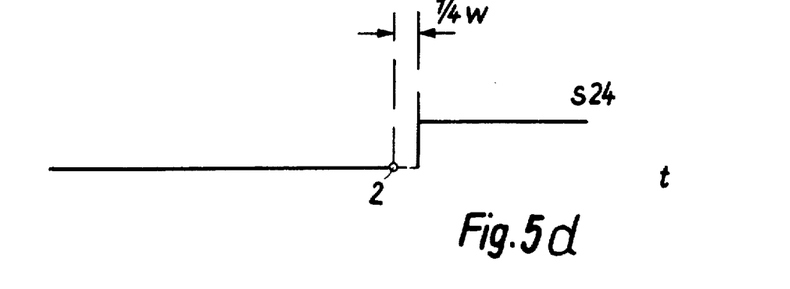

With such a selection of the delay time $T_o$ and the attenuation D, the value of the independent variable $x$ belonging to value y2, in this case thus the time ty2 at which the peak value 7 appears, corresponds to the moment of intersection of the envelope curves 5,3 and 5,4 as shown in FIG. 4b, i.e., to the time when there exists equality in amplitude between the pulses i3 and i4 present at the outputs of the measuring arrangements 15 and 16, which arrangements preferably both include, as described above, the measurement receiver 17, these pulses being converted into stepped input signals S20, S21 by two peak value detectors 20 and 21 which are connected in series with the measuring arrangements 15 and 16, respectively. The signals produced by these receivers are illustrated in FIG. 5c. The peak value detectors 20 and 21 have their outputs connected to respective inputs 22 and 23 of a comparator 24.

If the input signals S20 and S21 to comparator 24 have values indicating occurrence of the given ratio V the condition for the reference value 2 is met and comparator 24 could emit a reference signal. Since, however, experience has shown that interference will be noticed mainly as amplitude fluctuations, the peak values 6 and 7 of the oscillation S may be distorted by such interference. In order for them to respond nevertheless, a certain tolerance range must be given with respect to the given ratio so that a reference value 2 which has been determined from the appearance of the given ratio V also will have a certain tolerance width with respect to distance E' (see FIGS. 2 and 5a) from the desired value 1.

For the exact determination of the zero point 4 of the envelope curve 5 the comparator 24 is enabled to emit the reference signal S24 when the given ratio V appears; the reference signal S24 is actually released however by a signal from a zero passage detector 26 applied via a trigger input 25 to comparator 24. The zero passage detector 26 has its input connected with the measurement receiver 17 and emits an output signal with every zero passage of the oscillation S of pulses i2, i.e., at the steepest point of the oscillation curve, and thus provides an output signal which is accurately located with respect to time.

The comparator 24 is controlled by an output signal from zero passsage detector 26 when the input signals S20 and S21 at the inputs 22 and 23 thereof indicate occurrence of the selected ratio V. Thus the reference signal S24 appears at a precisely defined point in time which is no longer influenced by the above-mentioned interferences.

The time measuring device 11 has a precursor scale region 28 whose duration corresponds to the distance E' of the reference value 2 from the zero point 4 of the envelope curve 5. The time measuring device 11 is stopped by the reference signal S24 and then directly shows the time interval between the emission of a pulse i by generator 12 and its appearance as pulse i1 at the output 9 of the transmission channel 10.

The reference signal S24 advantageously further controls a blocking circuit 29 which interrupts the emission of signals i2 from the measurement receiver 17 for a time period approximately corresponding to the known time duration of the signals i2; this effectively prevents the portion of oscillation S following the moment of triggering of the comparator 24 from influencing comparator 24. This is important, for example, if the further course of the envelope curve 5 and the constancy of widths w of oscillation S be disturbed by interference so that the renewed actuation of a reference signal S24 is prevented if breaks occur in the further course of the envelope curve, which accidentally again have the given ratio V. The blocking circuit 29 can be unlocked again by a signal delivered via a trigger line 30 at the begginning of a new measuring period, i.e., with the emission of a new pulse i.

The attenuation D of the attenuation member 19 can be freely selected within given limits. If, for example, the attenuation D is set exactly for the ratio V between two successive peak values 6 and 7 of the oscillation S of signal i2, as shown in FIG. 5a, the comparator S24 is designed to enable the emission of the reference signal S24 when the input signals S20 and S21 at its two inputs 22 and 23 are identical.

Figures 6A, 6B, 6C, 6D:
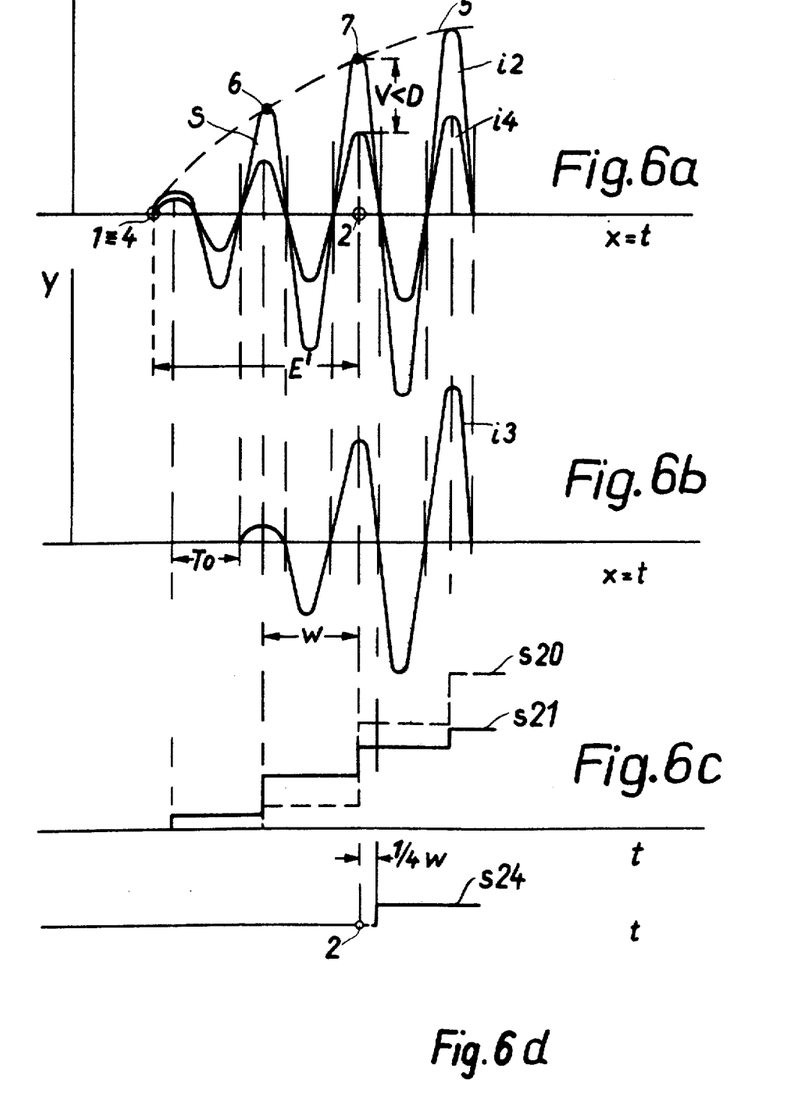
FIGS. 6a, 6b, 6c and 6d show the same output signals as FIGS. 5, but for the case where the circuit of FIG. 3 contains an attenuating member with a greater attenuation than that providing the curves of FIG. 5.

According to the known shape of the envelope curve 5 the desired zero point 4 of the envelope curve 5 with the attenuation D given here lies two and one-half oscillation periods w of the oscillation S before the time of appearance of the reference signal S24. Advantageously, however, the attenuation D of the attenuation member 19 is not equal to the ratio V between the two peak values 6, 7, but is rather selected to be somewhat higher, as shown in FIG. 6, but less than the ratio of two not directly successive peak values. Then comparator 24 is enabled to emit the reference signal S24 only when the input signal S20 exceeds the input signal S21.

This special design of the attenuation member 19 and comparator 24 prevents the actuation of the reference signal S24 before the appearance of the pulses i1 at the output of the transmission channel 10 since now a specific inequality between the input signals S20 and S21 at the comparator 24 is required.

A preferred use of the present invention is one in which the pulse generator 12 is an echo sounder and the measurement receiver 17 is an echo signal receiver.

The time which expires between the emission of a pulse i and its reception as pulse i1, determines the length of the measuring path (transmission channel 10) with known transmission behavior over the measuring path.

If the length of the measuring path is known, it is possible, if the problem to be solved is different, to clearly determine, for example, the transmission behavior of the medium by accurate time measurement with the use of the circuit arrangement of the present invention.

Since echo sound receivers are narrowbanded receivers, the signal i2 is an oscillation S with increasing amplitude whose envelope curve 5 is a good approximation of the curve of an exponential function.

The previous problems inherent, for example, in the accurate length measurement of the measuring path by accurate determination of the beginning of the envelope curve 5 are thus solved by the present invention in an elegant and dependable manner.

The comparator 24 includes a reference means 241 and an AND-gate 242. The inputs of the reference means 241 are connected to the inputs 22, 23 of the comparator 24. The output of the reference means 241 is connected to a input of the AND-gate 241, and another input of the AND-gate is connected to the input 25 of the comparator 24. The output of the AND-gate is the output of the comparator 24.

It will be understood that the above description of the present invention is susceptible to various modifications, changes and adaptations and the same are intended to be coprehended within the meaning and range of equivalents of the appended claims.

We claim:

1. A circuit arrangement for producing a reference value for the zero point of the independent variable of a nonlinear function representing the envelope of a train of oscillations, the curve of the function being such that the dependent variable of the function varies, and the peak values of the oscillations vary, regularly and unidirectionally as the independent variable varies in a given direction, the oscillation periods being equal to one another and each being a selected independent variable magnitude, and the relationship between the reference value and the zero point being determined entirely by this function curve, said arrangement comprising: measuring means for producing indications of the dependent variable values of pairs of oscillation peaks of a single envelope, the pairs of peaks being spaced apart by a selected number of oscillation periods; and comparator means connected to receive such indications and to emit a comparison signal representing the reference value when a given ratio exists between the dependent variable values of one such pair of peaks, the given ratio corresponding to a fixed number of oscillations between the zero point and one of the oscillation peaks of such pair.

2. An arrangement as defined in claim 1 wherein the independent variable is time.

3. Circuit arrangement as defined in claim 1 wherein said measuring means comprises: a measurement receiver; shifting means connected to said receiver for shifting the output therefrom relative to the independent variable by an amount equal to the selected number of oscillation periods; attenuation means connected to said receiver for attenuating the dependent variable values of the receiver output by an amount related to the given ratio; and peak value detector means connected between the outputs of said shifting means and said attenuating means and inputs of said comparator means for causing such comparison signal to be emitted at the output of said comparator means when the values of the signals from said detector means indicate that the given ratio is present between the dependent variable values of such a pair of peaks.

4. Circuit arrangement as defined in claim 3 wherein the attenuation of said attenuating means corresponds to the ratio of the two selected peak values.

5. Circuit arrangement as defined in claim 3 wherein said attenuation means are arranged to produce an attenuation whose value is between that which corresponds to the given ratio and that which corresponds to the ratio between the value of that peak which belongs to the pair yielding the given ratio and which is further from the zero point and the value of the peak which appears directly before the other oscillation of such pair.

6. Circuit arrangement as defined in claim 3, further comprising zero passage detector means connected between the output of said measurement receiver and a trigger input of said comparator means, said comparator means thus being enabled when the given ratio occurs between the dependent variable values of a pair of oscillation peaks, and the resulting comparison signal being released by a signal at the trigger input upon the subsequent zero passage of the oscillations in a given direction.

7. Circuit arrangement as defined in claim 3 associated with a transmission channel presenting a variable signal delay time and producing at its output, in response to a pulse at its input, a train of oscillations having a known and constant frequency, wherein the independent variable is time, the transient behavior of said measurement receiver to such train of oscillations constitutes said nonlinear function, and the input of said receiver is connected to the output of the transmission channel, said arrangement further comprising: a time measuring device having a start input and a stop input; and means applying a signal to said start input in time coincidence with the application of such a pulse to the transmission channel input; said comparator being connected to deliver said comparison signal to said stop input, and said time measuring device being arranged to indicate the difference between the interval from application of a signal to its start input and application of a signal to its stop input and the interval represented by the distance E' of the reference value 2 from the zero point 4 of the envelope curve 5.

8. Circuit arrangement as defined in claim 7 wherein said time measuring device comprises a display on which total elapsed time between signals at its start and stop inputs are indicated, the initial portion of said display being constituted by a time precursor corresponding in length to at least the duration of such distance E'.

9. Circuit arrangement as defined in claim 8 further comprising zero passage detector means connected between the output of said measurement receiver and a trigger input of said comparator means, said comparator means thus being enabled when the given ratio occurs between the dependent variable values of a pair of oscillation peaks, and the resulting comparison signal being released by a signal at the trigger input upon the subsequent zero passage of the oscillations in a given direction, wherein said precursor has a length corresponding to the duration of such shift and to the time interval between enabling and releasing of the comparison signal.

10. Circuit arrangement as defined in claim 7 wherein a plurality of pulses are applied to the input of the transmission channel, and further comprising a blocking circuit connected to said measurement receiver and to said comparator for blocking the production of an output from said measurement receiver, upon occurrence of a comparison signal, for the duration of the oscillations occurring at the channel output in response to a single pulse at the channel input.

11. Circuit arrangement as defined in claim 10 wherein said blocking circuit has a reset input for receiving a signal which unblocks said measurement receivers, said blocking circuit being resettable by having its reset input connected to receive pulses appearing at the input of said transmission channel.

12. Circuit arrangement as defined in claim 1 wherein said comparator means emits such comparison signal when the given ratio between the dependent variable values of one such pair of peaks has a predetermined value unequal to one.

* * * * *